(12) United States Patent
Hendriks et al.

(10) Patent No.: US 7,663,278 B2
(45) Date of Patent: Feb. 16, 2010

(54) FLUID BEARING WITH A VARIABLE WIDTH GROOVE

(75) Inventors: Ferdinand Hendriks, Morgan Hill, CA (US); Brian H. Thornton, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/454,452

(22) Filed: Jun. 15, 2006

(65) Prior Publication Data

US 2007/0290559 A1   Dec. 20, 2007

(51) Int. Cl.
*H02K 5/16* (2006.01)
(52) U.S. Cl. ........................................ 310/90
(58) Field of Classification Search ............ 310/90, 310/90.5
See application file for complete search history.

(56) References Cited

U.S. PATENT DOCUMENTS

| | | | |
|---|---|---|---|
| 3,484,143 A | 12/1969 | Tallian et al. | |
| 4,200,344 A * | 4/1980 | Binns et al. | 384/107 |
| 5,973,878 A | 10/1999 | Yoshida et al. | |
| 6,082,900 A | 7/2000 | Takeuchi et al. | |
| 6,176,618 B1 * | 1/2001 | Kawawada et al. | 384/107 |
| 6,200,035 B1 | 3/2001 | Otsuki | |
| 6,276,831 B1 | 8/2001 | Takahashi et al. | |
| 6,316,857 B1 * | 11/2001 | Jeong | 310/90 |
| 6,417,590 B1 * | 7/2002 | Komura et al. | 310/90.5 |
| 6,428,211 B1 | 8/2002 | Murabe et al. | |
| 6,900,567 B2 * | 5/2005 | Aiello et al. | 310/90 |
| 7,095,147 B2 * | 8/2006 | Aiello et al. | 310/90 |
| 2004/0105601 A1 | 6/2004 | Honda et al. | |

* cited by examiner

*Primary Examiner*—Nguyen N Hanh

(57) ABSTRACT

A fluid bearing that utilizes a variable width groove is described. The fluid bearing includes two surfaces that are rotatable relative to one another, with a groove on at least one of the surface. The borders of the groove are a non-constant width from one another.

24 Claims, 6 Drawing Sheets

FLUID BEARING WITH A VARIABLE WIDTH GROOVE

TECHNICAL FIELD

The present invention relates to hard disk drives, and in particular to fluid bearings used in hard disk drives.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm with a suspended slider is utilized to reach out over the disk. The arm carries a head assembly that has a magnetic read/write transducer or head for writing or reading information to or from a location on the disk. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

The spindle assembly includes bearing components—specifically, fluid dynamic bearings—that support rotation of the disk. These fluid dynamic bearings create fluid pressure between the stationary and rotating sections of the spindle assembly. Current fluid dynamic bearing geometries have tradeoffs with respect to performance metrics such as stiffness, damping, stability (the propensity to ingest air), and running torque (power consumption).

SUMMARY

A fluid bearing that utilizes a variable width groove is described. The fluid bearing includes two surfaces that are rotatable relative to one another, with a groove on at least one of the surface. The borders of the groove are a non-constant width from one another.

BEST MODES FOR CARRYING OUT THE INVENTION

Reference will now be made in detail to the alternative embodiments of the present invention; a fluid bearing that utilizes a variable width groove. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a fluid bearing in conjunction with its operation within a hard disk drive spindle motor and components connected therewith. The discussion will then focus on embodiments of a fluid bearing with variable width grooves.

Figure 1:
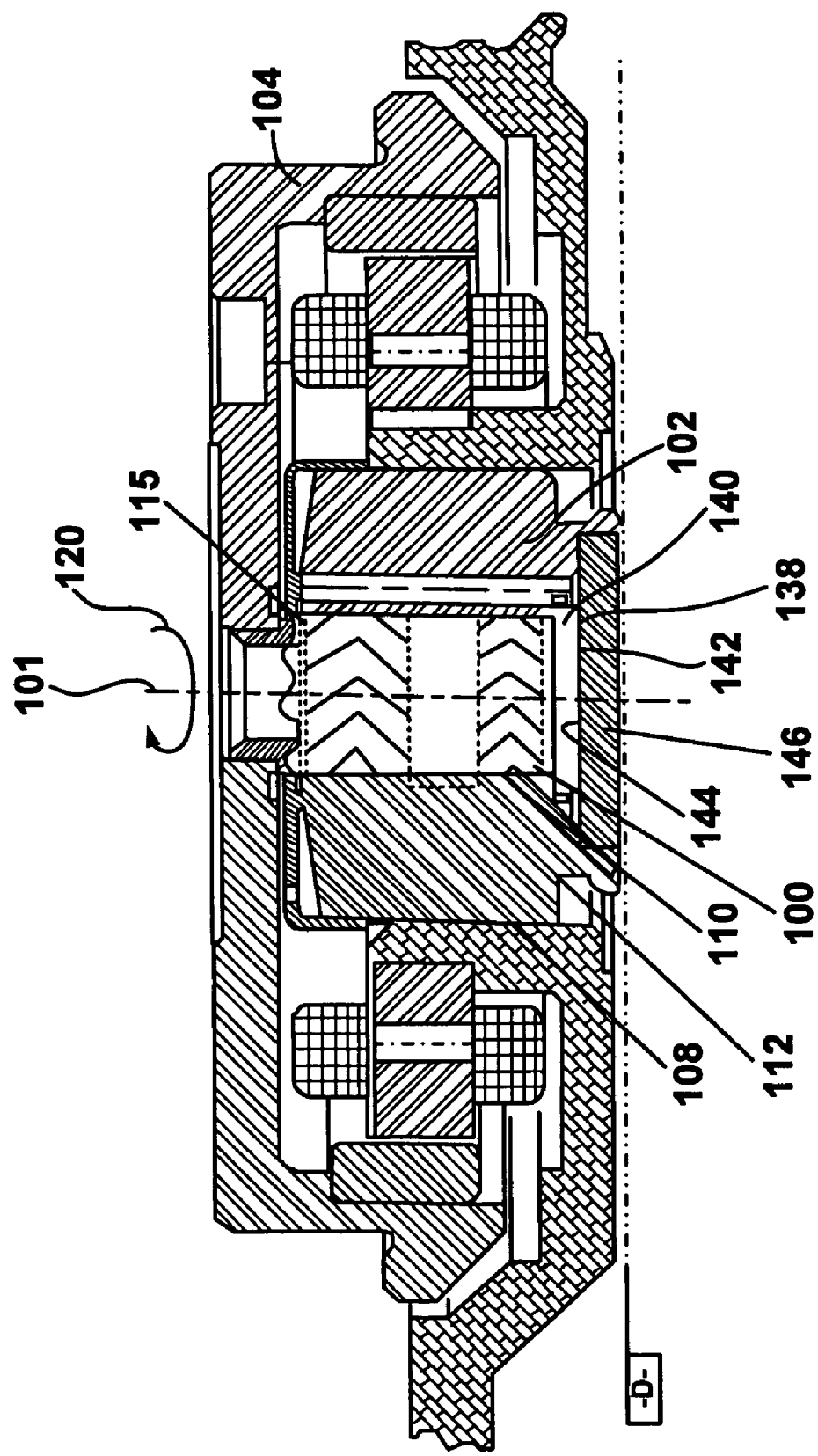
FIG. 1 is a vertical sectional view of a disk drive spindle motor incorporating fluid dynamic bearings according to embodiments of the present invention.

FIG. 1 shows a disk drive spindle motor in which fluid bearing designs of the present invention are useful; however, the present invention is not so limited. That is, the fluid bearings to be described below may be useful in other applications.

FIG. 1 is a vertical sectional view of a shaft 100 rotating within a sleeve 102 and supporting a hub 104 for rotation with the shaft. The hub 104 supports one or more disks for rotation within the disk drive. To provide a stable support between the sleeve 102 and shaft 100, fluid dynamic journal bearings 108 and 110 are provided in the gap 112 between the inner surface of sleeve 102 and the outer surface of shaft 100. An exemplary groove pattern 115 is shown in the two groove bearing regions 108 and 110. The grooves 115 generate hydrodynamic pressure to maintain space between the outer surface of the shaft 100 and the inner surface of the sleeve 102. The grooves 115 may be formed on either or both of the inner and outer surfaces.

In the example of FIG. 1, the grooves are slanted upward and downward relative to the direction of rotation 120, their outer ends are directed forward, and their inner ends are directed rearward relative to the direction of rotation, in order to drive the fluid toward the apex of each of the grooves 115. Dynamic pressure is generated in the gap between the surface of the shaft 100 and the surface of the sleeve 102 due to the relative rotary motion of the shaft and sleeve. As the shaft or sleeve moves in the direction of arrow 120, fluid between the shaft and sleeve flows along each groove. Thus, the grooves 115 both accumulate and retain fluid in the gap between the shaft 100 and the sleeve 102, and pressurize the fluid to increase the bearing load.

The embodiment of FIG. 1 also utilizes a thrust bearing 138 between the plate 140 on the end of shaft 100 or end of shaft 142 and the facing surface 144 of counterplate 146. Grooves may be formed on either surface of the thrust bearing, pumping fluid along the grooves toward the center axis 101. The rotational action of the grooves both accumulates fluid in the grooves and maintains fluid in the gap, and generates the necessary pressure to boost the shaft and surface 142 above the facing surface of the counterplate to allow for free relative rotation without frictional contact.

The grooves on the thrust bearing 138 can also be shaped in accordance with the principals of the present invention in order to enhance the stiffness, damping and stability characteristics of the bearing while not increasing running torque.

The groove shapes of the present invention may be advantageously employed on the bearing surfaces of fluid bearings shown in the following figures; however, the invention is not limited to these motor designs. In a journal bearing, grooves may be formed on the outer surface of the shaft, the inner surface of the sleeve or part of each surface. Grooves also may be used on thrust bearing surfaces, either on the thrust plate or counter plate; or on either surface of a conical or spherical bearing. The figures that follow illustrate a number of exemplary groove shapes according to embodiments of the present invention.

Figure 2:
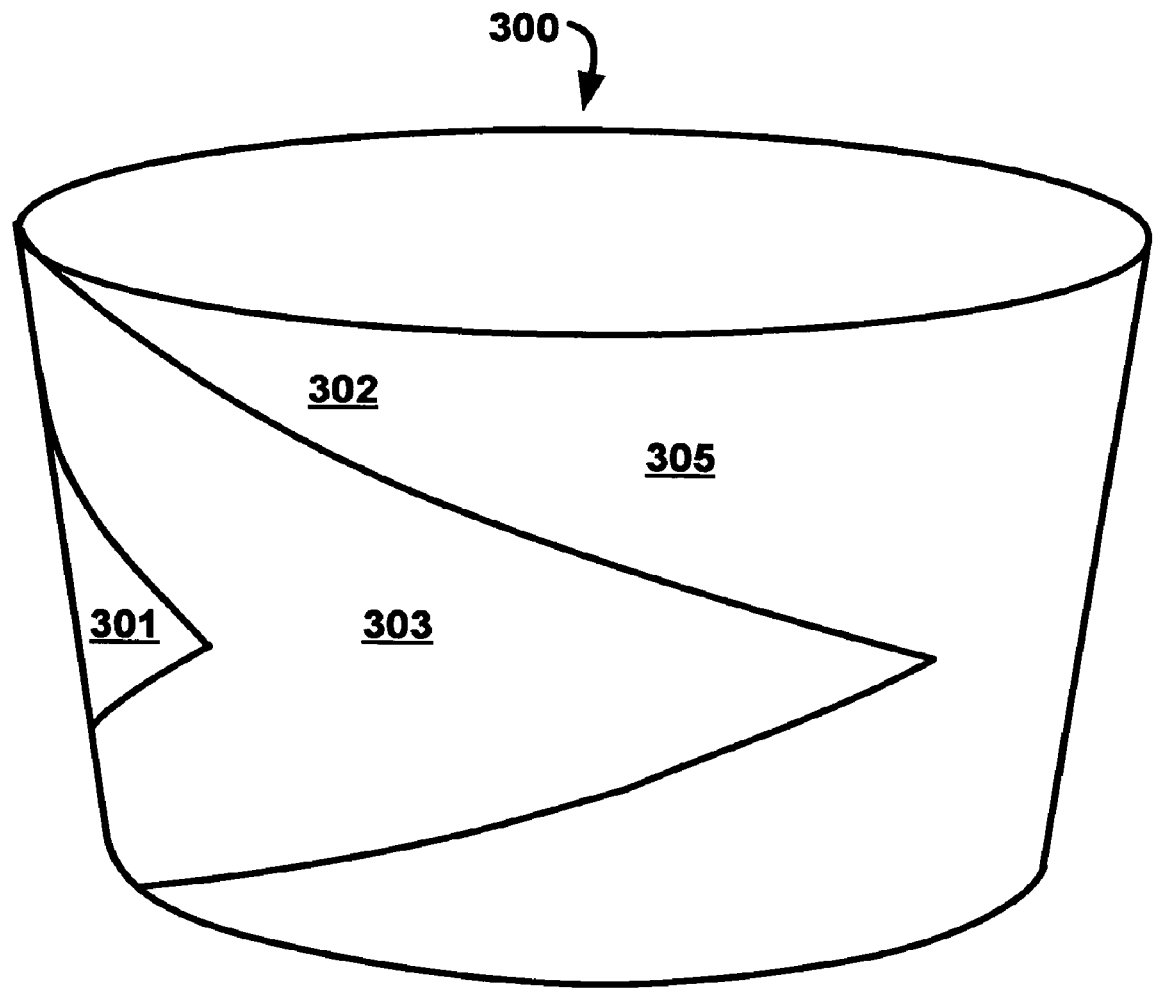
FIG. 2 is a view of an exemplary fluid bearing with a groove, in accordance with one embodiment of the present invention.

With reference to FIG. 2, a view of a cylindrical fluid bearing 300 with an exemplary groove 303 is illustrated. FIG. 2 illustrates a single groove; however, there may be more than one groove. In the present embodiment, the groove borders 301 and 302 can be represented as linear, continuous line segments that separate the groove 303 from the land of the bearing surface 305.

Figure 3:
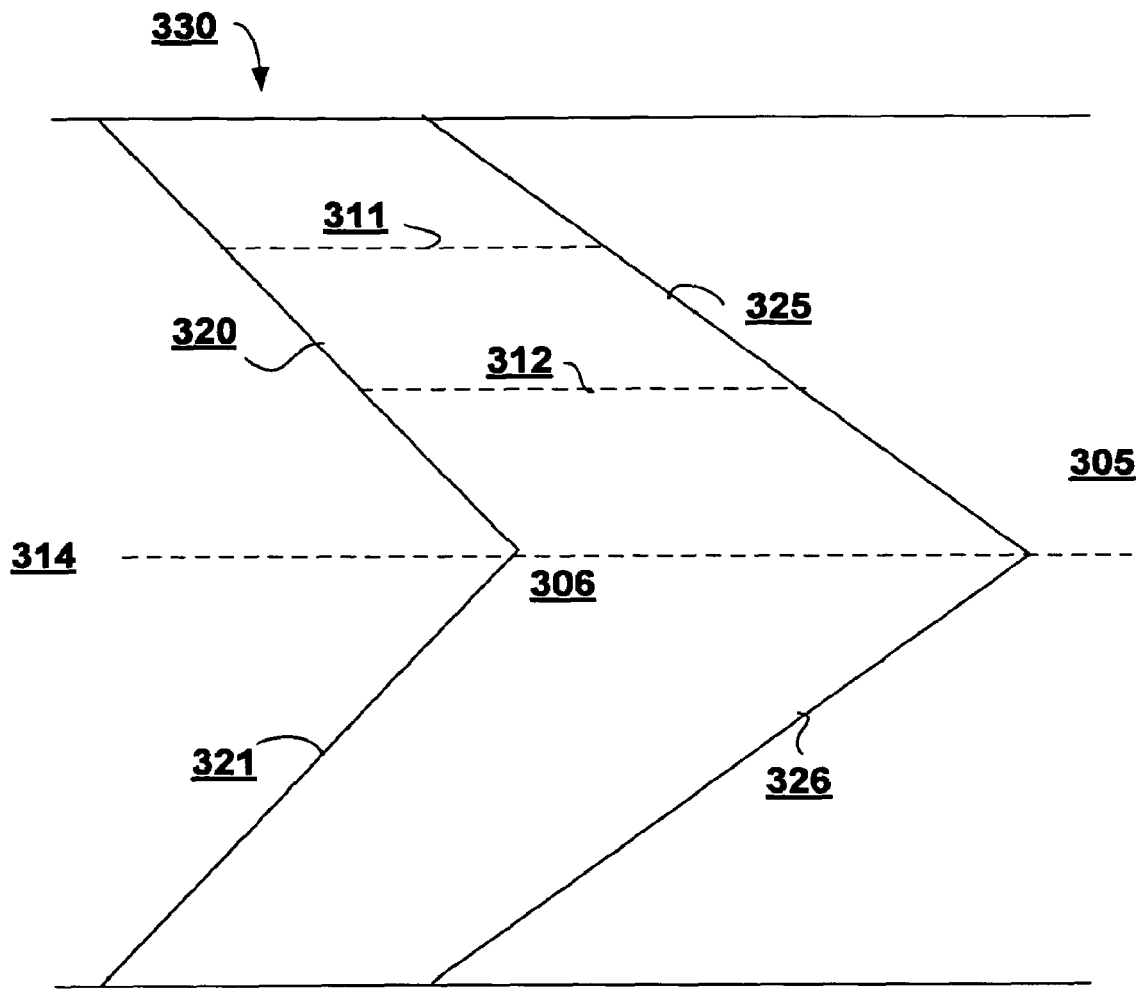
FIG. 3 is a view of an exemplary variable width groove with borders that are linear and continuous in accordance with one embodiment of this present invention.

FIG. 3 illustrates a view of a groove 330 formed in the surface 305 of a fluid bearing according to one embodiment of the present invention. In essence, FIG. 3 represents a flattened or unrolled view of a cylindrical fluid bearing. In the present embodiment, the groove borders 325 and 326 can be represented as linear, continuous line segments that meet at an apex 305. Similarly, in the present embodiment, groove borders 320 and 321 can be represented as linear, continuous line segments that meet at an apex 306. Significantly, the width of the groove 330 is non-constant. For example, dashed lines 311 and 312 are not the same length yet both cover a width of the groove 330.

In the present embodiment, groove borders 325 and 326 and groove borders 320 and 321 are symmetrical about the dashed line 314. Also, considering the orientation of FIG. 3, the top portion of the groove 330 is a mirror image of the bottom portion of the groove. However, the present invention is not so limited; that is, the groove 330 may not be symmetrical about the dashed line 314, and the top and bottom portions may not be mirror images.

Figure 4:
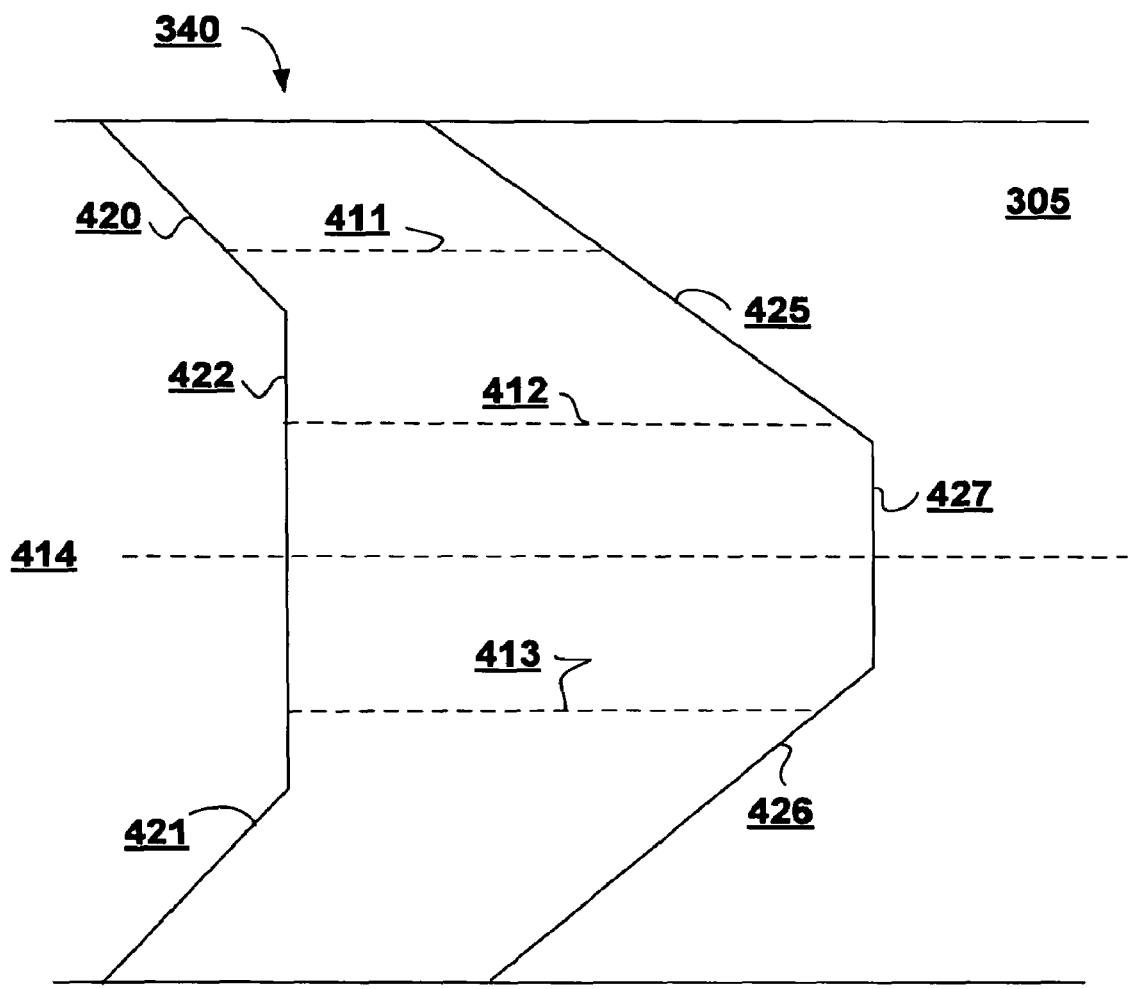
FIG. 4 is a view of an exemplary variable width groove with borders that are linear and discontinuous in accordance with one embodiment of this present invention.

FIG. 4 illustrates a view of a groove 340 formed in the surface 305 of a fluid bearing according to one embodiment of the present invention. In essence, FIG. 4 represents a flattened or unrolled view of a cylindrical fluid bearing. In the present embodiment, the groove borders 425, 426 and 427 can be represented as linear line segments that in totality are discontinuous. Similarly, in the present embodiment, groove borders 420, 421 and 422 can be represented as linear line segments that in totality are discontinuous. Significantly, the width of the groove 340 is non-constant. For example, dashed lines 411, 412 and 413 are not the same length yet both cover a width of the groove 340.

In the present embodiment, groove borders 425, 426 and 427 and groove borders 420, 421 and 422 are symmetrical about the dashed line 414. Also, considering the orientation of FIG. 4, the top portion of the groove 340 is a mirror image of the bottom portion of the groove. However, the present invention is not so limited; that is, the groove 340 may not be symmetrical about the dashed line 414, and the top and bottom portions may not be mirror images.

Figure 5:
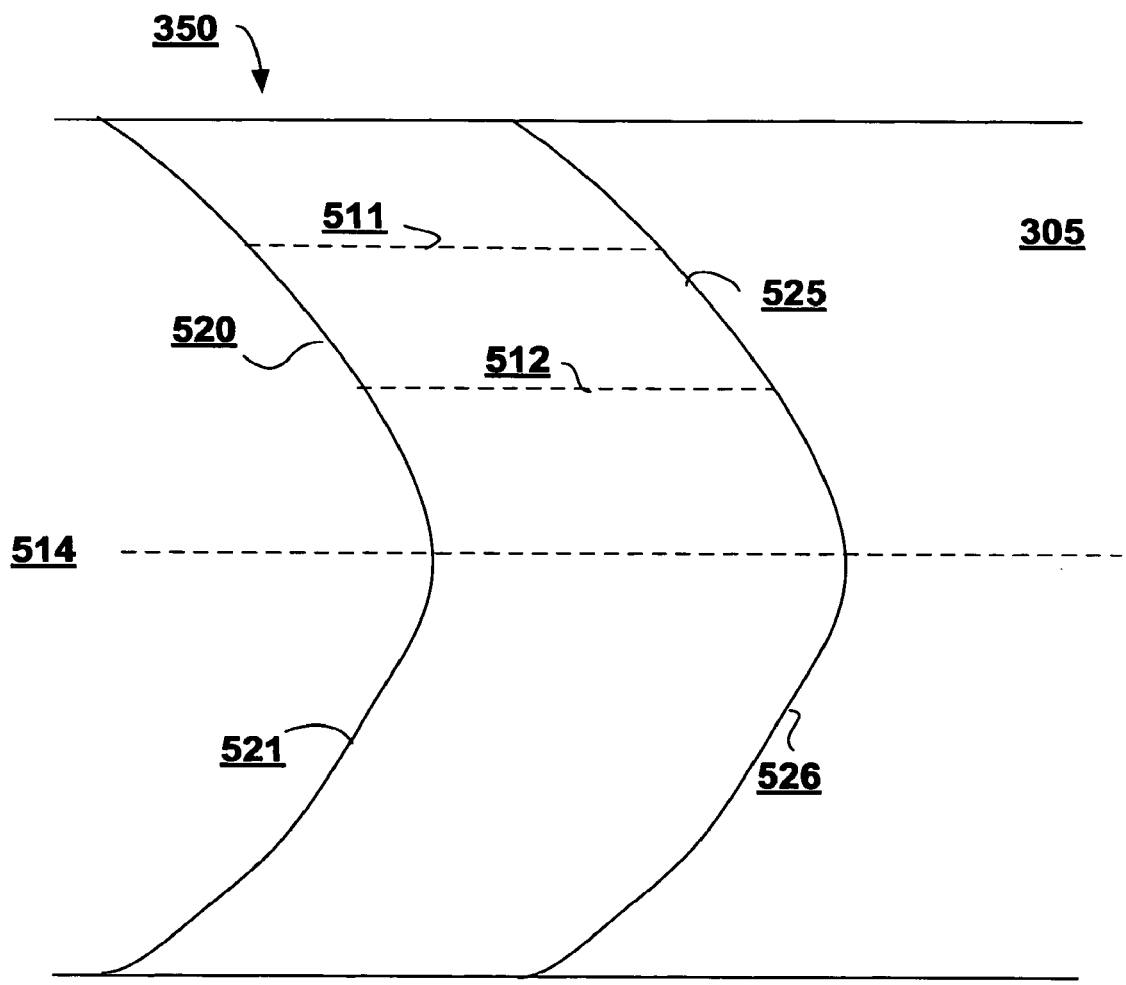
FIG. 5 is a view of an exemplary variable width groove with borders that are non-linear and continuous in accordance with one embodiment of this present invention.

FIG. 5 illustrates a view of a groove 350 formed in the surface 305 of a fluid bearing according to one embodiment of the present invention. In essence, FIG. 5 represents a flattened or unrolled view of a cylindrical fluid bearing. In the present embodiment, the groove borders 525 and 526 can be represented as non-linear (e.g., curved) but continuous line segments. Similarly, in the present embodiment, groove borders 520 and 521 can be represented as non-linear but continuous line segments. Significantly, the width of the groove 350 is non-constant. For example, dashed lines 511 and 512 are not the same length yet both cover a width of the groove 350.

In the present embodiment, groove borders 525 and 526 and groove borders 520 and 521 are symmetrical about the dashed line 514. Also, considering the orientation of FIG. 5, the top portion of the groove 350 is a mirror image of the bottom portion of the groove. However, the present invention is not so limited; that is, the groove 350 may not be symmetrical about the dashed line 514, and the top and bottom portions may not be mirror images.

Figure 6:
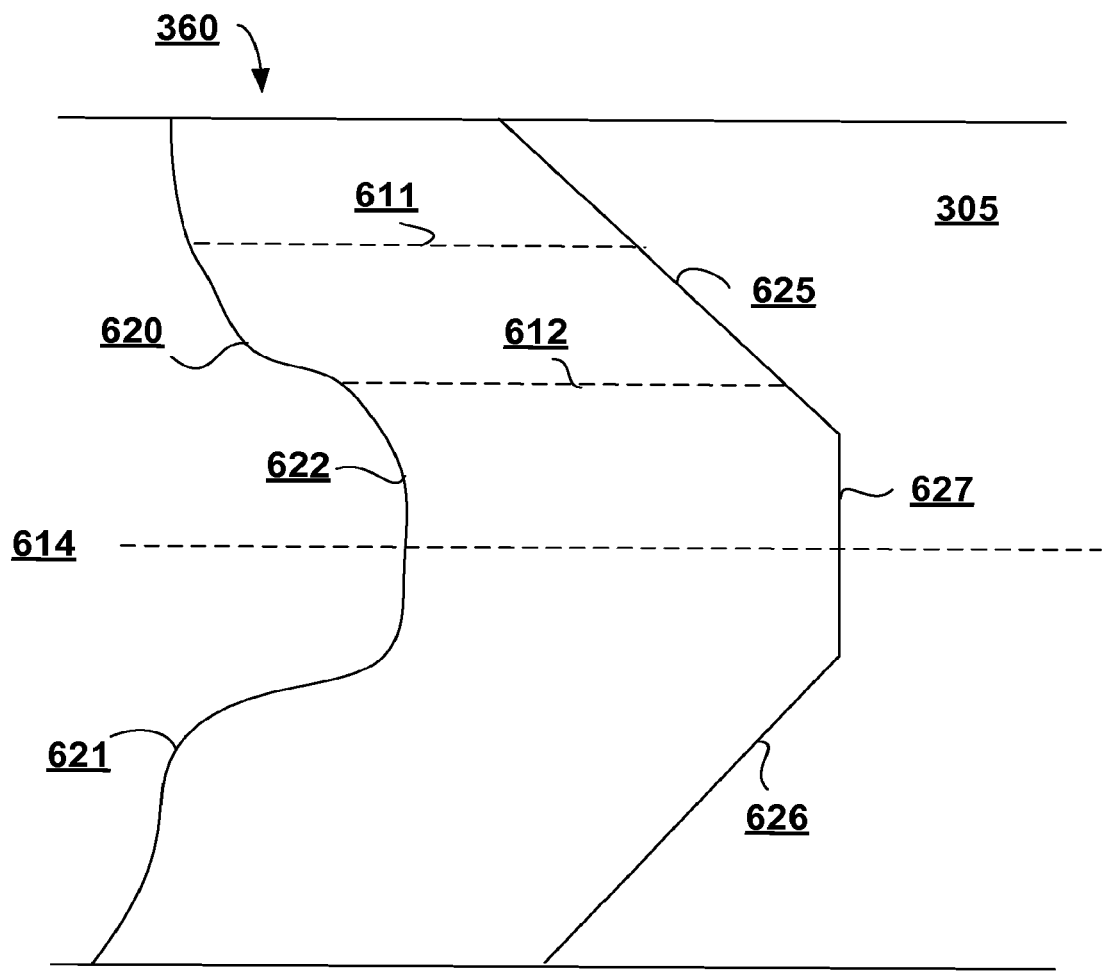
FIG. 6 is a view of an exemplary variable width groove with borders that are non-linear and discontinuous in accordance with one embodiment of this present invention.

FIG. 6 illustrates a view of a groove 360 formed in the surface 305 of a fluid bearing according to one embodiment of the present invention. In essence, FIG. 6 represents a flattened or unrolled view of a cylindrical fluid bearing. In the present embodiment, the groove borders 625, 626 and 627 can be represented as non-linear (e.g., curved) line segments that in totality are discontinuous. Similarly, in the present embodiment, groove borders 620, 621 and 622 can be represented as non-linear line segments that in totality are discontinuous. Significantly, the width of the groove 360 is non-constant. For example, dashed lines 611 and 612 are not the same length yet both cover a width of the groove 360.

In the present embodiment, groove borders 625, 626 and 627 and groove borders 620, 621 and 622 are symmetrical about the dashed line 614. Also, considering the orientation of FIG. 6, the top portion of the groove 360 is a mirror image of the bottom portion of the groove. However, the present invention is not so limited; that is, the groove 360 may not be symmetrical about the dashed line 614, and the top and bottom portions may not be mirror images.

While the embodiments illustrated in FIGS. 2-6 show specific instances of groove shapes, the present invention is suitable to alternative shapes. For example, with reference to FIG. 6, borders 625 and 626 may be linear while border 627 may be non-linear, or vice versa. Likewise, different combinations of shapes can be used depending upon the application. That is, for example, a fluid bearing may incorporate grooves all of the same shape, or some combination of the various general shapes described above.

Modeling simulation results based on the use of fluid bearings according to the embodiments of the present invention demonstrate that changing groove shape to change performance characteristics such as stiffness, damping, and stability does not proportionally change running torque. In other words, stiffness, damping and stability metrics can be positively changed without a commensurate negative effect on running torque. More specifically, a groove shape can be selected that increases stiffness and damping, for example, but decreases torque (and thus decreases power consumption).

Furthermore, the different groove shapes may affect the aforementioned performance characteristics by different amounts. Thus, as mentioned above, a groove shape can be selected depending upon the specific requirements of the intended application. In other words, a groove shape can be selected that provides a desired balance between the various performance characteristics.

Embodiments of the present invention, a fluid bearing that utilizes a variable width groove to increase design flexibility of performance characteristics, are thus described. While the present invention has been described in particular embodiments, it should be appreciated that the present invention should not be construed as limited by such embodiments, but rather construed according to the below claims.

What is claimed is:

1. A fluid bearing comprising:
   a first surface and a second surface, wherein one of said first and second surfaces is rotatable relative to the other of said first and second surfaces;
   a lubricating medium between said first surface and said second surface; and
   a plurality of grooves formed in either of said first surface or said second surface, said plurality of grooves comprising at least one groove having a linear border and at least one grove having a non-linear border, wherein both said linear border and said non-linear border of said plurality of grooves are a non-constant distance apart from each other.

2. The fluid bearing of claim 1, wherein said plurality of grooves are formed on said first surface, wherein said first surface is disposed on a shaft within a sleeve on which said second surface is disposed.

3. The fluid bearing of claim 1, wherein said plurality of grooves are formed on said second surface, wherein said second surface is disposed on a sleeve that encircles a shaft on which said first surface is disposed.

4. The fluid bearing of claim 1 further comprising forming said plurality of grooves on the other of said first and second surfaces.

5. The fluid bearing of claim 1, wherein the linear border is a continuous line.

6. The fluid bearing of claim 1, wherein the linear border is a discontinuous line.

7. The fluid bearing of claim 1, wherein the non-linear border is a continuous line.

8. The fluid bearing of claim 1, wherein the non-linear border is a discontinuous line.

9. A hard disk drive comprising:
   a housing;
   a disk pack having a plurality of disks that are rotatable relative to the housing;
   a fluid bearing mounted to the housing, said fluid bearing comprising:
   a first surface and a second surface, wherein one of said first and second surfaces is rotatable relative to the other of said first and second surfaces;
   a lubricating medium between said first surface and said second surface; and
   a plurality of grooves formed in either of said first surface or said second surface, said plurality of grooves comprising at least one groove having a linear border and at least one grove having a non-linear border, wherein both said linear border and said non-linear border of said plurality of grooves are a non-constant distance apart from each other.

10. The hard disk drive of claim 9, wherein said plurality of grooves are formed on said first surface, wherein said first surface is disposed on a shaft within a sleeve on which said second surface is disposed.

11. The hard disk drive of claim 9, wherein said plurality of grooves are formed on said second surface, wherein said second surface is disposed on a sleeve that encircles a shaft on which said first surface is disposed.

12. The hard disk drive of claim 9 further comprising forming said plurality of grooves on the other of said first and second surfaces.

13. The hard disk drive of claim 9, wherein said linear border is a continuous line.

14. The hard disk drive of claim 9, wherein said linear border is a discontinuous line.

15. The hard disk drive of claim 9, wherein said non-linear border is a continuous line.

16. The hard disk drive of claim 9, wherein said non-linear border is a discontinuous line.

17. A fluid bearing having variable width grooves, comprising:
   means for a first surface and a second surface, wherein one of said first and second surfaces is rotatable relative to the other of said first and second surfaces;
   means for a lubricating medium between said first surface and said second surface; and
   a plurality of groove means formed in either of said first surface or said second surface, said plurality of groove means comprising at least one groove means having a linear border and at least one grove means having a non-linear border, wherein both said linear border and said non-linear border of said plurality of grooves are a non-constant distance apart from each other.

18. The fluid bearing of claim 17, wherein said plurality of grooves are formed on said first surface, wherein said first surface is disposed on a shaft within a sleeve on which said second surface is disposed.

19. The fluid bearing of claim 17, wherein said plurality of grooves are formed on said second surface, wherein said second surface is disposed on a sleeve that encircles a shaft on which said first surface is disposed.

20. The fluid bearing of claim 17 further comprising forming said plurality of grooves on the other of said first and second surfaces.

21. The fluid bearing of claim 17, wherein said linear border is a continuous line.

22. The fluid bearing of claim 17, wherein said linear border is a discontinuous line.

23. The fluid bearing of claim 17, wherein said non-linear border is a continuous line.

24. The fluid bearing of claim 17, wherein said non-linear border is a discontinuous line.

* * * * *